Feb. 9, 1971  R. L. ORNDORFF, JR  3,561,830

BEARING ASSEMBLY

Filed April 22, 1968  2 Sheets-Sheet 1

INVENTOR
Roy L. Orndorff, Jr.
BY
W. A. Shira, Jr.
ATTY.

United States Patent Office 3,561,830
Patented Feb. 9, 1971

3,561,830
BEARING ASSEMBLY
Roy L. Orndorff, Jr., Kent, Ohio, assignor to The B. F. Goodrich Company, New York, N.Y., a corporation of New York
Filed Apr. 22, 1968, Ser. No. 722,977
Int. Cl. F16c 27/00
U.S. Cl. 308—238   13 Claims

ABSTRACT OF THE DISCLOSURE

A resilient elastomeric insert for bearings of the type used for marine propeller shafts. The insert is formed of low hardness elastomeric material and has rigid backing strips inserted in the elastomer spaced closely adjacent the bearing surfaces. The insert is formed in a one-piece cylindrical configuration for short bearings and is formed as a longitudinal strip for bearings of large diameter and length which have the bearing surface provided by a plurality of separately removable strips.

BACKGROUND OF THE INVENTION

Resilient elastomeric bearings have been found especially suitable for bearings of the type used for marine propeller shafts. Elastomeric bearings provide the necessary corrosion resistance for use in water and further provide resistance to abrasion from particles of foreign material. Furthermore, elastomeric bearings continue to function normally under small shaft misalignment and are thus self-aligning to a limited extent. Lubrication is provided entirely by the operating medium, namely water, and therefore no other lubricant is required. The self-lubricating feature of the elastomeric bearing makes it highly desirable for marine use for stern propeller shaft journals.

One common type of elastomeric bearing for marine use employs a continuous ring of elastomer with an outer tubular shield of rigid material, usually metal, securely bonded thereto. Another common type of elastomeric bearing utilizes strips of elastomer with rigid backing strips bonded thereto with the elastomer and metal strips inserted longitudinally into recesses in the inner periphery of the journal housing. One-piece ring bearings are generally used for small shafts and/or those requiring only axially short bearings.

Two significant problems are encountered in service applications of elastomeric bearings, namely: (1) difficulties experienced during installation, as the elastomeric insert must be either press-fitted into the housing or bonded to a rigid mounting ring; and, (2) rapid shaft journal surface wear under high bearing loads. This latter problem arises when harder elastomeric compounds are used to withstand high bearing loads and particularly for low shaft speed applications. It has been found that elastomeric material of the low hardness reduces shaft journal surface wear; however, the low hardness elastomer is capable of accepting only modest bearing surface loads and therefore is unsuitable in applications having heavy bearing loads.

SUMMARY OF THE INVENTION

The present invention solves the above described problems by providing an insert of low hardness elastomeric material having strips of rigid material embedded longitudinally in the insert closely adjacent the bearing surfaces thereof. For bearings of short axial length and small diameter the insert is made in a one-piece hollow cylindrical configuration with a radial slot extending the full length of the insert to permit circumferential compression for slip fitting assembly into the bearing housing.

The insert is expanded circumferentially after assembly into the bearing housing by inserting locking means into the longitudinal slit.

Elastomeric strips are provided for bearings of considerable axial length and large diameters, for slip fitting assembly into longitudnal grooves in the bearing housing bore. The strips of the present invention have backing inserts of rigid material embedded in the elastomer and spaced closely adjacent the portions of the strip which contact the shaft journal. The rigid backing inserts provide the necessary support for the low hardness elastomer in the bearing surface portion of the strip. The rigid backing strip provides support for the bearing surface, but in view of the resilient elastomer intermediate the backing strip and the bearing housing, the backing strip is resiliently supported and capable of reorientation under running load thereby retaining the self-aligning features of the elastomeric bearing. Furthermore, the invention provides a reduced coefficient of friction and improved wearing as does a harder surface material, but without the attendant rapid shaft journal wear accompanying harder materials.

DETAILED DESCRIPTION

Figures 1, 2:
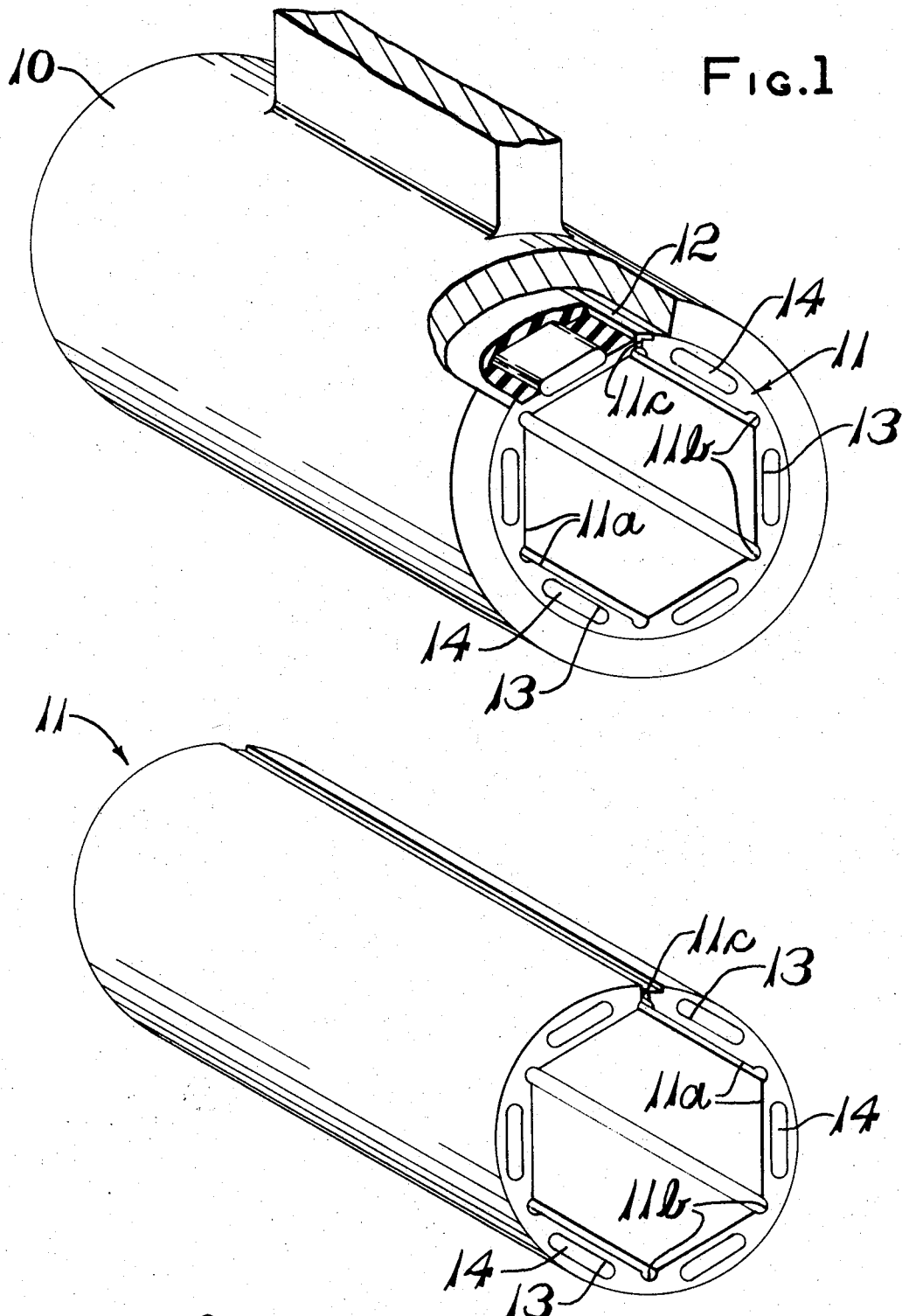
FIG. 1 is a perspective view of a complete bearing assembly for a marine propeller shaft, with a portion of the housing broken away to expose the elastomeric bearing.
FIG. 2 is a view similar to FIG. 1 with the housing removed to show the bearing sub-assembly in greater detail.

Referring to FIG. 1, a rigid bearing housing 10, usually of metal material of the type used for marine propeller shaft housings, is shown with a central circular bore therethrough in which a hollow cylindrical insert 11 of low hardness elastomeric material is inserted. The insert 11 has a plurality of substantially planar longitudinally extending bearing surfaces 11a formed on the inner periphery of the insert and equally spaced therearound. The bearing surfaces 11a have their adjacent longitudinal edges terminating in radial grooves 11b extending the length of the insert 11. A radial slit 11c is cut through the wall of the insert 11, which slit also extends longitudinally the length of the insert. The radial slit 11c permits easy assembly of the insert 11 into the bearing housing 10 by allowing circumferential compression of the insert for slip-fitting assembly into the bore of the housing 10.

When the insert 11 has been assembled into the housing 10, a rigid locking means, shown in FIG. 1 as a rigid strip 12, having a right-angle shaped transverse section, is press-fitted into the slit 11c, thereby expanding the insert 11 circumferentially to exert pressure against the inner periphery of the bore of the housing 10. In the present practice of the invention, the strip 12 is made of metal but it may be made of any other material of suitable stiffness capable of withstanding the longitudinal force required to press the strip 12 into the slit 11c. The strip 12, in the presently preferred form of the invention, has a generally L-shaped transverse section with one leg received in the slit 11c and the other leg received in a longitudinal recess cut along the outer periphery of the insert 11. The invention is not limited however, to an L-shaped strip 12, a T-shape or any other convenient expedient may be used. The leg of the strip 12 which extends at a right angle to the slit 11c and into a longitudinal recess in the insert 11, serves to prevent radially inward movement of the strip 12 and thus disengagement of the slit 11c or interference with a rotating shaft journal received in the insert.

The elastomeric insert has a plurality of longitudinal slots 13 formed therein with one slot spaced closely adjacent each bearing surface 11a. Each of the slots 13 extends the full length of the insert 11 and has a rigid backing strip 14 received therein for providing radial support to the adjacent bearing surface. The embodiment of FIG. 1 thus provides a one-piece elastomeric bearing insert which may be slip-fitted into the bore of a bearing housing and secured therein by subsequent insertion of a separate locking means.

Referring now to FIG. 2, the preferred form of the invention is shown as an elastomeric insert sub-assembly as it appears immediately prior to installation in the bearing housing 10. The sub-assembly comprises a hollow cylindrical bearing insert 11 made of low hardness elastomeric material having a durometer hardness not greater than 70 on the Shore "A" scale.

The insert 11 has a plurality of substantially planar longitudinal bearing surfaces 11a disposed about its inner periphery in equally spaced arrangement. The bearing surfaces 11a extend the full length of the insert 11 thereby forming a polygonal shape to the inner periphery of the insert. The longitudinal edges of each adjacent bearing surfaces 11a, which thus form the sides of the polygonal inner periphery each communicates with a common groove 11b between adjacent bearing surfaces, which groove is formed radially outward from the inner periphery of the inert and extends longitudinally the length of the insert 11. Each of the grooves 11b serves to provide a channel which tends to catch foreign particles and permit water to flow therethrough for removal of any foreign particles and lubricate the bearing.

A plurality of longitudinal slots 13 each having two opposite parallel straight sides are formed in the elastomeric material with one of said slots spaced closely adjacent each bearing surface. The straight sides of each slot are parallel to the adjacent bearing surface, and each slot extends the full length of the insert for receiving a backing strip therein.

An elongated strip 14 having a transverse section identical in shape but adapted to provide an interference fit is pressed longitudinally into each slot 13 for providing a backing for the low hardness elastomeric bearing surface 11a. In the presently preferred form of the invention, each of the strips 14 is made of rigid plastic material. However, metal or any other suitable material may be used which is capable of withstanding the forces of press-fitting the strip 14 into the slot 13 yet is sufficiently resilient to resist shattering during installation. The embodiment of FIG. 2 thus provides a one-piece elastomeric insert made of a low hardness elastomer and having rigid strips for backing the bearing surfaces therein.

Figure 3:
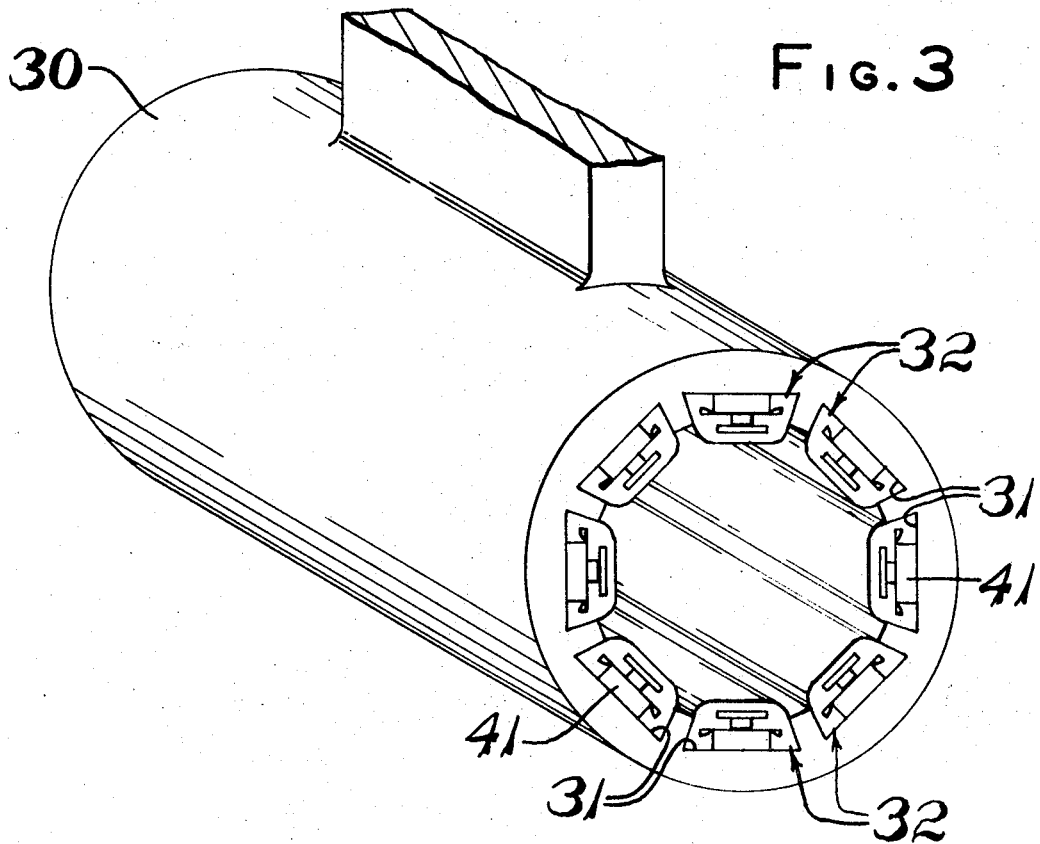
FIG. 3 is a view similar to FIG. 1 of another embodiment of the invention having elastomeric bearing strips inserted in the housing.
Figure 4:
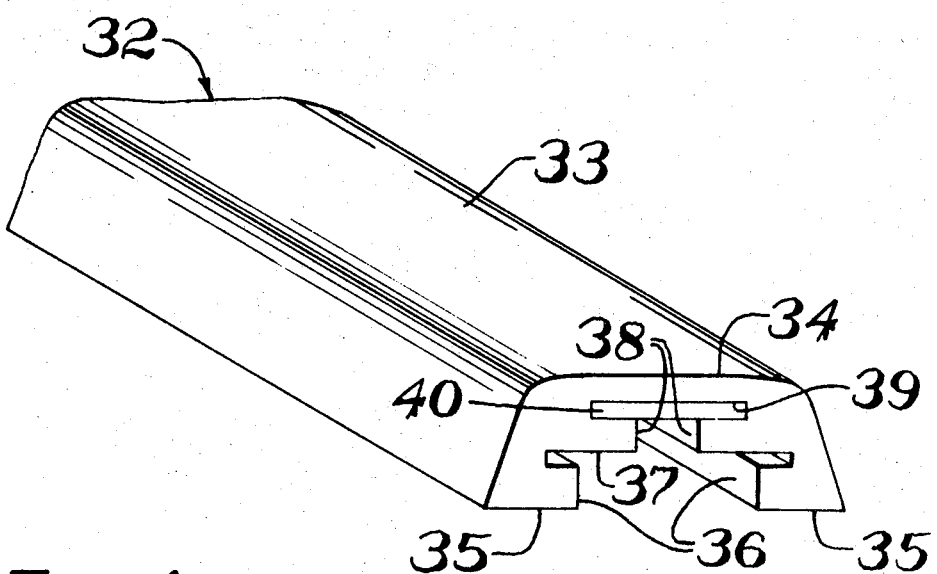
FIG. 4 is an enlarged perspective view showing the strips of the embodiment of FIG. 3 in greater detail.

Referring now to FIG. 3 and FIG. 4, another embodiment of the invention is illustrated wherein a bearing housing 30 of the type used for marine propeller shafts is shown as having a plurality of radial groves 31 formed around the periphery of the bore through the housing, with the grooves extending the full length of the housing and arranged in equally spaced parallel relationsip. A longitudinal strip assembly 32 is received in each of the grooves 31 to provide a plurality of longitudinally disposed bearing surfaces spaced about the inner periphery of the bearing housing.

Referring now to FIG. 4, a portion of one of the strip asemblies 32 is shown substantially enlarged and in greater detail. The strip assembly 32 comprises an elongated strip 33 of low modulus elastomer with a durometer hardness not greater than 70 on the Shore "A" scale. The strip has two opposite substantially parallel planar surfaces 34 and 35 of which one surface 34 is adapted for contacting a rotating shaft, as a bearing surface. The other one of said surfaces 35 is adapted to contact the bottom of one of the radial grooves in the bore of the housing 30 of FIG. 3. The surface 35 has a groove formed therein extending longitudinally the length of the strip 33. The groove has parallel sides 36 substantially perpendicular to the surface 35 with a flat bottom 37, the sides 36 being undercut at the intersection with the bottom 37. A second groove having straight parallel sides 38 is formed centrally of the bottom 37 of the first groove with a width substantially less than the width of said first groove and also extending the full length of the strip 33. The sides 38 of the second groove are undercut substantially wider than the width of the second groove. The flat bottom 39 of the second groove is spaced closely adjacent the bearing surface 34 and the second groove is adapted to receive a backing strip therein for supporting the bearing surface 34. The undercut portion of the sides 38 thus form a transverse slot having opposite parallel sides bounded on one side by the bottom 39 of the second groove, and communicating on the opposite side with the first groove. For bearings of either the type of FIG. 1 or FIG. 3 designed to receive shaft journals larger than one inch in diameter, the thickness of material between the groove bottom 39 and the bearing surface 34 is in the range of 0.062–0.100 inch for elastomer not greater than 70 durometer on the Shore "A" scale.

A rigid longitudinal strip 40 formed of plastic or other rigid material and having a transverse section, identical in shape but adapted to be press-fitted into the slot formed by the undercut sides of the second groove, is received in the said second groove for providing a backing for the bearing surface 34. One each of the assembly 32 of FIG. 4 is then received in a slip-fitting manner into each groove 31 in the bearing housing 30 of FIG. 3. A locking bar 41 of rigid plastic material and having a transverse section identical in shape as that of the first groove formed in the insert 33 but adapted to be press-fitted into the first groove is received in the said first groove thereby securing elastomeric strip assembly 32 into the bearing housing. The embodiment of FIGS. 3 and 4 thus comprises an elastomeric bearing insert of low hardness material having a rigid backing strip adjacent the bearing surface which bearing strip is capable of being slip-fitted into grooves in the inner periphery of the bearing housing and secured therein by subsequent insertion of a separate locking means. The low hardness elastomeric insert thus provides a bearing surface for a rotating shaft journal, with the backing strip providing the necessary radial support for the elastomeric bearing surface and the locking bar exerting force on the side of the elastomeric insert in the bearing housing.

The invention is capable of modification and further adaptation by those having ordinary skill within the art and is accordingly limited only by the spirit and scope of the below added claims.

I claim:

1. A bearing assembly comprising:
   (a) a rigid housing having a bore therethrough;
   (b) an insert of elastomeric material having a hollow generally cylindrical configuration with a plurality of longitudinal bearing surfaces of generally rectangular shape disposed about the inner periphery of said insert in equally spaced arrangement with each two adjacent bearing surfaces separated peripherally by a longitudinal groove formed in the inner periphery of said insert wherein a longitudinal slot of rectangular cross section is formed in the elastomeric material radially outward of each of said bearing surfaces intermediate the inner and outer peripheries of said insert in closely spaced parallel relationship to and substantially the width of the adjacent bearing surface;
   (c) a plurality of rigid backing strips of cross section corresponding to said slots with one of said backing strips received in each of the slots in said insert in a press fitting manner; and (d) said insert is received in the bore of said housing.

2. The bearing assembly defined in claim 1, wherein said insert is made of elastomeric material having a durometer hardness not greater than 70 on the Shore "A" scale.

3. The bearing assembly defined in claim 1, wherein the said insert has a radial slit formed in the wall thereof extending the length of the insert which slit has a locking means removably received therein.

4. The bearing assembly defined in claim 3, wherein said slit is L-shaped in transverse section with one leg extending at right angles to the said radial portion of the slit on the radially outer surface of the insert.

5. A bearing insert comprising:
   (a) a body of resilient elastomeric material having a plurality of longitudinal bearing surfaces disposed about the inner periphery thereof in equally spaced arrangement with each two adjacent bearing surfaces being separated peripherally by a groove permanently formed in the inner periphery of said insert which groove extends longitudinally continuously the length of the insert; and,
   (b) a strip of rigid material disposed in the elastomeric material spaced closely adjacent to each bearing surface intermediate the inner and outer surfaces of said body of elastomeric material wherein each said strip extends longitudinally the full length of said insert and peripherally substantially the width of the adjacent bearing surface.

6. The insert defined in claim 5, wherein each bearing surface is substantially planar forming a polygonal transverse section to the insert, and each of said strips has a rectangular cross-section with one face parallel to said bearing surface.

7. The insert defined in claim 5, wherein the said body is made of elastomeric material having durometer hardness not greater than 70 on the Shore "A" scale.

8. The insert defined in claim 5, wherein said body has a radial slit formed in the wall thereof extending the length of the insert which slit is adapted for receiving a locking means therein.

9. The insert defined in claim 5, wherein said slit is L-shaped in transverse section with one leg extending at right angles to the said radial portion of the slit on the radially outer surface of the insert.

10. A bearing insert characterized in that
   (a) the insert is a strip of elastomeric material haivng a generally rectangular transverse section with two opposite substantially planar parallel faces;
   (b) one of said planar surfaces is adapted to contact a rotating shaft as a bearing surface;
   (c) said strip has a longitudinal slot formed therein with a substantially rectangular cross-section disposed in closely spaced parallel relationship with said bearing surface intermediate the said opposite parallel faces;
   (d) said planar surface opposite said bearing surface has a first longitudinal groove therein having parallel sides and a flat bottom;
   (e) said first groove has a second groove formed in the said flat bottom thereof of width less than said first groove and interconnecting said first groove with said slot, and said strip is adapted to have a rigid backing strip press-fitted into said slot and is further adapted to slip-fit in a groove in a bearing housing and adapted to be secured therein by press-fitting a locking bar means to said first groove.

11. The insert defined in claim 10 further characterized in that the said insert is made of elastomeric material having a durometer hardness not greater than 70 on the Shore "A" scale.

12. An insert sub-assembly for a bearing which has a bore provided with a plurality of longitudinally extending grooves each adapted to receive a bearing surface insert, the said insert sub-assembly comprising:
   (a) an elongated strip of elastomer of generally rectangular cross section having opposed faces one of which provides a bearing surface, the said strip having a longitudinally extending slot therein extending the full length of said insert, said slot having its width substantially that of said bearing surface and extending generally parallel to the bearing surface and spaced inwardly of the said opposed faces; and
   (b) a bar of rigid material received in the slot of said strip in press-fitting manner extending therein the full length of said insert, thereby providing a rigid backing for said bearing surface, the said strip also having a second longitudinally extending opening in the face opposite said bearing surface adapted to removably receive a locking means for retaining said insert sub-assembly in a longitudinal groove provided in the bore of a bearing.

13. The sub-assembly defined in claim 12, wherein said strip is made of elastomeric material having a durometer hardness not greater than 70 on the Shore "A" scale.

References Cited

UNITED STATES PATENTS

| | | | |
|---|---|---|---|
| 1,890,529 | 12/1932 | Santiago | 308—4A |
| 2,219,519 | 10/1940 | Fabrin | 308—4A |
| 2,310,923 | 2/1943 | Bean | 308—4A |
| 2,506,188 | 5/1950 | Alviset | 308—4A |
| 3,302,988 | 2/1967 | Senter | 308—238 |
| 3,455,613 | 7/1969 | McGrath | 308—26 |
| 3,455,619 | 7/1969 | McGrath | 308—238 |

FRED C. MATTERN, JR., Primary Examiner

W. S. RATLIFF, JR., Assistant Examiner

U.S. Cl. X.R.

308—26